US009868419B2

(12) United States Patent
Miller et al.

(10) Patent No.: US 9,868,419 B2
(45) Date of Patent: Jan. 16, 2018

(54) WINDSHIELD WIPER SYSTEM

(71) Applicant: AIRBUS HELICOPTERS DEUTSCHLAND GMBH, Donauworth (DE)

(72) Inventors: Vitali Miller, Landsberg Lech (DE); Roland Luik, Wilburgstetten (DE)

(73) Assignee: AIRBUS HELICOPTERS DEUTSCHLAND GMBH, Donauworth (DE)

(*) Notice: Subject to any disclaimer, the term of this patent is extended or adjusted under 35 U.S.C. 154(b) by 388 days.

(21) Appl. No.: 14/528,473

(22) Filed: Oct. 30, 2014

(65) Prior Publication Data

US 2015/0121641 A1    May 7, 2015

(30) Foreign Application Priority Data

Nov. 5, 2013 (EP) .................................. 13400025

(51) Int. Cl.
*B60S 1/34* (2006.01)
*B60S 1/42* (2006.01)
(Continued)

(52) U.S. Cl.
CPC ........... *B60S 1/3406* (2013.01); *B60S 1/3409* (2013.01); *B60S 1/42* (2013.01); *B60S 1/44* (2013.01);
(Continued)

(58) Field of Classification Search
CPC .... B60S 1/3402; B60S 1/3406; B60S 1/3409; B60S 1/3404; B60S 1/0452; B60S 1/44; B64C 1/14; B64C 1/1476; B64C 1/1484
(Continued)

(56) References Cited

U.S. PATENT DOCUMENTS 2,286,449 A * 6/1942 Wahlberg ............... B60S 1/3404
                                                        15/250.23
2,376,012 A * 5/1945 Sacchini ............... B60S 1/3404
                                                        15/250.202
(Continued)

FOREIGN PATENT DOCUMENTS

CN            2871318 Y      2/2007
CN         201998952 U      10/2011
(Continued)

OTHER PUBLICATIONS

European Search Report for EP 13400025, Completed by the European Patent Office dated May 21, 2014, 3 Pages.
(Continued)

*Primary Examiner* — Gary Graham
(74) *Attorney, Agent, or Firm* — Brooks Kushman P.C.

(57) ABSTRACT

A windshield wiper system (3) for vehicles. A windshield (1) has a curved surface. The system (3) comprises two wiper arms (14) and one wiper blade (5), one of said two wiper arms (14) being mounted to said oscillating gear drive (2), said wiper blade (5) being mounted by means of said two wiper arms (14) distal to said oscillating gear drive (2) for oscillation across the windshield (1). Said two wiper arms (14) have each along said curved surface of the windshield (1) a respectively pivotal wiper arm axis (8). At least one cranked fitting (16) and a prolongation fitting (7) are provided, said wiper blade (5) being mounted rotatable about a wiper blade rotation axis (9) by means of said wiper blade holder (21) and said wiper blade fit bolt (22) to said prolongation fitting (7). Said prolongation fitting (7) is mounted rotatable about prolongation fitting rotation axes (18). Said prolongation fitting rotation axes (18) is inclined to said respective wiper arm axis of each of the two wiper arms (14) by an angle 45°<δ<135°.

8 Claims, 8 Drawing Sheets

(51) Int. Cl.
*B60S 1/44* (2006.01)
*B60S 1/04* (2006.01)
*B64C 1/14* (2006.01)
*B60S 1/38* (2006.01)

(52) U.S. Cl.
CPC ...... *B60S 1/0452* (2013.01); *B60S 2001/3837* (2013.01); *B64C 1/1476* (2013.01)

(58) Field of Classification Search
USPC ........................................ 15/250.21, 250.23
See application file for complete search history.

(56) References Cited

U.S. PATENT DOCUMENTS

| | | | | |
|---|---|---|---|---|
| 2,642,612 A | * | 6/1953 | Smulski | B60S 1/3404 15/250.23 |
| 2,691,790 A | * | 10/1954 | O'Shei | B60S 1/34 15/250.351 |
| 3,006,017 A | * | 10/1961 | Krohm | B60S 1/3404 15/250.32 |
| 3,076,991 A | * | 2/1963 | Macpherson | B60S 1/3406 15/250.23 |
| 3,128,490 A | * | 4/1964 | Alfieri | B60S 1/3404 15/250.23 |
| 3,852,845 A | * | 12/1974 | Quinlan | B60S 1/3406 15/250.23 |
| 3,939,525 A | * | 2/1976 | Stratton | B60S 1/36 15/250.351 |
| 4,675,933 A | * | 6/1987 | Martin, Jr. | B60S 1/3404 15/250.23 |
| 4,958,405 A | | 9/1990 | Kuhbauch | |
| 5,033,157 A | | 7/1991 | Von Meltzing et al. | |
| 5,502,866 A | | 4/1996 | Battlogg | |
| 5,634,234 A | * | 6/1997 | Allain | B60R 1/0602 15/250.003 |
| 6,272,717 B1 | * | 8/2001 | Saraydar | B60S 1/28 15/250.23 |
| 2002/0056168 A1 | | 5/2002 | Horii et al. | |

FOREIGN PATENT DOCUMENTS

| | | |
|---|---|---|
| DE | 102004016251 A1 | 10/2005 |
| EP | 0296081 | 12/1988 |
| EP | 0317767 | 5/1989 |
| EP | 0351528 | 1/1990 |
| EP | 1769986 A2 | 4/2007 |
| FR | 2625152 * | 6/1989 |
| FR | 2746355 | 9/1997 |
| FR | 2757815 | 7/1998 |
| FR | 2988666 | 10/2013 |
| RU | 2020092 C1 | 9/1994 |
| RU | 2184662 C2 * | 7/2002 |
| WO | 9205982 | 4/1992 |
| WO | 2005095170 | 10/2005 |

OTHER PUBLICATIONS

Chinese First Office Action dated Jun. 20, 2016, Application No. 201410619194.3, Applicant Airbus Helicopters Deutschland GmbH, 5 Pages.

* cited by examiner

WINDSHIELD WIPER SYSTEM

CROSS REFERENCE TO RELATED APPLICATION

This application claims priority to European patent application No. EP 13 400025.6 filed on Nov. 5, 2013, the disclosure of which is incorporated in its entirety by reference herein.

BACKGROUND OF THE INVENTION (1) Field of the Invention

The invention is related to a windshield wiper system for vehicles, particularly a windshield wiper system for rotary wing aircrafts as a helicopter.

(2) Description of Related Art

The cleaning performance of wiper blades depends on a lean angle ($\alpha$) between a wiper blade axis (Y), which is perpendicular to the longitudinal extension of the wiper blade (1) and is going through the contact point of a lip of the wiper blade with the windshield outer surface and a perpendicular line ($Y_1$) to the windshield outer surface at said same contact point.

The best cleaning performance of a wiper blade is provided when the wiper blade is perpendicular to the windshield surface. Due to strong curvatures of modern windshields, particularly the strong curvatures of windshields of rotary wing aircrafts, the cleaning performance of wiper blades is not continuous in all windshield areas. Especially towards the outer left or outer right side position the windshields of nowadays helicopters are strongly curved which leads to a poor cleaning performance in this area by using conventional wiper systems.

Lean angles $\alpha$ higher than 20° lead to very poor cleaning performance and moreover the frame holding the lip of the wiper blade touches the windshield and subsequently the bias of the lip of the wiper blade against the windshield is restricted. A further consequence of the frame touching the windshield is that the frame during operation may scratch the windshield.

The document EP0317767 describes a windshield wiper arrangement for curved surfaces. The arrangement has a retainer, a joint shaft pivotally coupled to the retainer about an axis, a wiper blade having a longitudinal axis and that is coupled to the joint shaft so that the longitudinal axis of the wiper blade is parallel to the axis of the joint shaft. A linkage allows driving the wiper blade across a surface to be wiped. The linkage comprises at least one steering arm and an extension mounted on the steering arm. The steering arm is pivotally coupled to the retainer. A universal joint has a lever that is attached to the joint shaft and the extension of the steering arm is slidably received in the universal joint so that the lever is positively locked to the linkage. The extension is free to move axially in the universal joint, whereby the wiper blade can be pivoted under constraint about the joint shaft in a plane radial to the surface to be wiped.

The document U.S. Pat. No. 5,502,866 or WO9205982 describes a windshield wiper arrangement for curved surfaces with a joint shaft, a retainer and a wiper blade coupled to the joint shaft so that a longitudinal axis is parallel to an axis of the joint shaft. A linkage for the wiper blade to be driven across the surface comprises at least one steering arm and an extension mounted thereon. The steering arm is pivotally coupled to the retainer and a universal joint with a lever is attached to the joint shaft. The extension is slidably received in the universal joint so that the lever is positively locked to the linkage. The extension is free to move axially in the universal joint, whereby the wiper blade can be pivoted under constraint about the joint shaft in a plane radial to the surface to be wiped.

The document WO2005095170 describes a wiper arm assembly for windshield wiper systems having one or more arms. At one end where a wiper blade is located, the arm has a wiper blade holder. The coupling to the arm enables the wiper to pivot about an axis running in a longitudinal direction of the blade and to pivot about the longitudinal direction in a controlled manner. An additional control arm orientates the wiper blade perpendicular to the vehicle window.

The document FR2988666 describes a wiper with a sweeping unit and a drive system. The sweeping unit includes a scraper and a cambered and notched carrying rod. A toothed wheel engages with the rod for reciprocating movement of the rod. A fixed cambered guide slides relative to the rod and guides the rod. The rod extends from a distal end toward a proximal end secured to the sweeping unit.

The document FR2746355 describes a windscreen wiper with a wiper arm. This arm is mounted on a wiper head unit, which allows the arm to pivot around a transverse axis. The transverse axis is roughly parallel to the general plane of the windscreen. The wiper head has a main body mounted at the upper end of a drive shaft. The body carries a link head, which is mounted to pivot around a longitudinal axis. The longitudinal axis is roughly parallel to the plane of the glass. A slide moves within the main body, under the control of a cam and as a function of the angular position of the wiper arm. The slider and the link head are connected together. The control rod acts along the longitudinal axis to cause the head to slide within a bore of the slider, so that as the slider moves under the control of the cam. Thus, the link head rotates according to the angular position of the wiper arm.

The documents FR2757815, EP0296081 and EP0351528 show wiper systems with control of the wiper blade lean angle $\alpha$. An additional control arm or other mechanic control parts and/or piloting actuators for orienting the wiper blade perpendicular to the vehicle windshield are disclosed. Different windshields with different degrees of curvature necessitate different special control parts and/or piloting actuators according to said prior art resulting in a high number of different special control parts and/or piloting actuators respectively for small series at relatively high costs.

The document US2002/0056168 proposes a wiper system, able to orient the wiper blade perpendicular to the windshield, where the control of a local lean angle along the wiper blade by the twist of wiper blade is the objective of the system. The additional orientation control of the local angle along the blade is more expensive, heavier and more complex in realization.

BRIEF SUMMARY OF THE INVENTION

It is the objective of the invention to provide a windshield wiper system for vehicles, particularly a windshield wiper system for rotary wing aircrafts with improved cleaning performance.

The solution is provided with a windshield wiper system for vehicles, with the features of claim 1. The invention also provides for a rotary wing aircraft having such a system.

According to the invention a windshield wiper system for vehicles, is provided with a windshield having a curved surface and two wiper arms, each respectively attached to one drive bracket in driving engagement and biased against said surface of said windshield. Each of said drive brackets has a longitudinal extension and defines a longitudinal bracket axis (U) along its longitudinal extension.

An oscillating drive is mounted at said windshield. At least one of said two spring loaded wiper arms is mounted at said oscillating drive for oscillation about an oscillatory axis (V) across the windshield. Said longitudinal axis (U) is perpendicular to said oscillatory axis (V) and said oscillation is along a transversal axis (W), perpendicular to said longitudinal axis (U) and said oscillatory axis (V). The windshield wiper system comprises one wiper blade mounted by means of said two wiper arms to said oscillating drive. Said wiper blade is mounted respectively to said wiper arms distal to said oscillatory axis. Said wiper blade defines when in a park position (A) a longitudinal blade extension (l) along said curved surface of the windshield. The wiper blade is designed flexible in its longitudinal extension. Said wiper arms define respectively a wiper arm axis in its longitudinal extension and are aligned in said central park position (A) with said longitudinal extension (l) of the wiper blade.

A wiper blade shaft, a wiper blade holder, cranked fittings, bolts, bearing bushes and a prolongation fitting are provided. Said wiper blade is mounted rotatable about a wiper blade rotation axis by means of said wiper blade shaft to said prolongation fitting. Said wiper blade rotation axis is perpendicular to said oscillatory axis (V) and said longitudinal bracket axis (U) in park position (A) of the wiper system. Said prolongation fitting is mounted by means of said bearing bushes and bolts respectively rotatable about prolongation fitting rotation axes perpendicular to said cranked fittings. Said prolongation fitting rotation axes are inclined to said respective wiper arm axis of each of the two wiper arms by an angle $45°<\delta<135°$.

The inventive windshield wiper system allows adaptive orientation of the wiper blade rotation axis tangential to the windshield. The inventive windshield wiper system further allows installation of the wiper system on different windshields with different grades of curvature—either convex or concave—without fundamental design changes and already existing wiper systems can be easily modified with the inventive windshield wiper system for adaptive orientation of the wiper blade rotation axis tangential to the curved windshields.

BRIEF DESCRIPTION OF THE SEVERAL VIEWS OF THE DRAWINGS

Embodiments of the invention are described with reference to the following description and drawings.

DETAILED DESCRIPTION OF THE INVENTION

Figure 1:
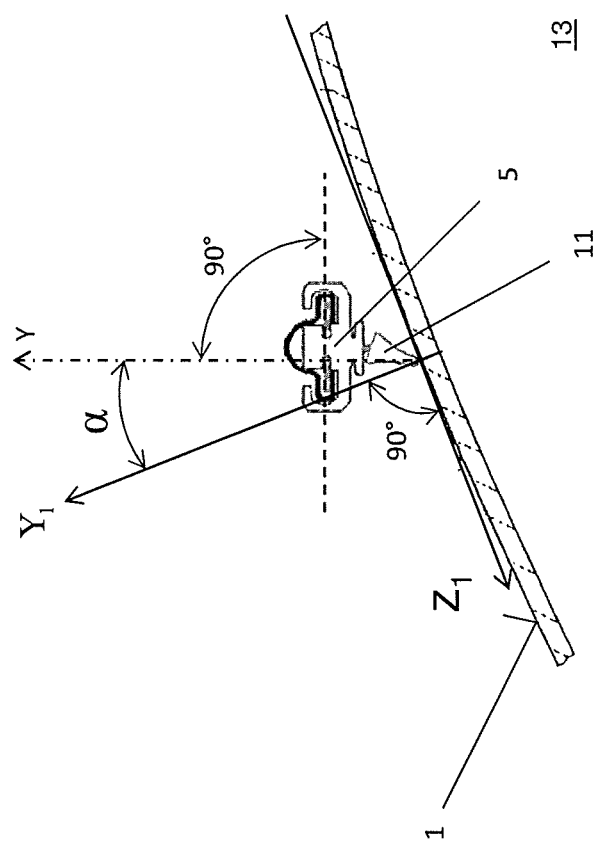
FIG. 1 shows a cross sectional view through a wiper blade on a curved windshield of a rotary wing aircraft.

According to FIG. 1 a vehicle 13 is a rotary wing aircraft, e.g., a helicopter. The vehicle 13 has a windshield surface 1 that is having a strong curved. A windshield wiper system 3 for the outer windshield surface 1 comprises a wiper blade 5 with a wiper blade lip 11 at a contact point on the outer windshield surface 1. A lean angle ($\alpha$) is defined between a wiper blade axis (Y), which is perpendicular to the longitudinal extension of the wiper blade 5 (l) and is going through the contact point of a lip 11 of the wiper blade 5 with the windshield outer surface 1 and a perpendicular line ($Y_1$) to the windshield outer surface 1 at said same contact point.

A target lean angle ($\alpha_T$) corresponds to the necessary angle of rotation of the wiper blade 5 about its longitudinal extension (l) to position the wiper blade axis (Y) through said contact point perpendicular to the windshield surface 1, where the lean angle ($\alpha$) is equal to 0°.

Figure 2A:
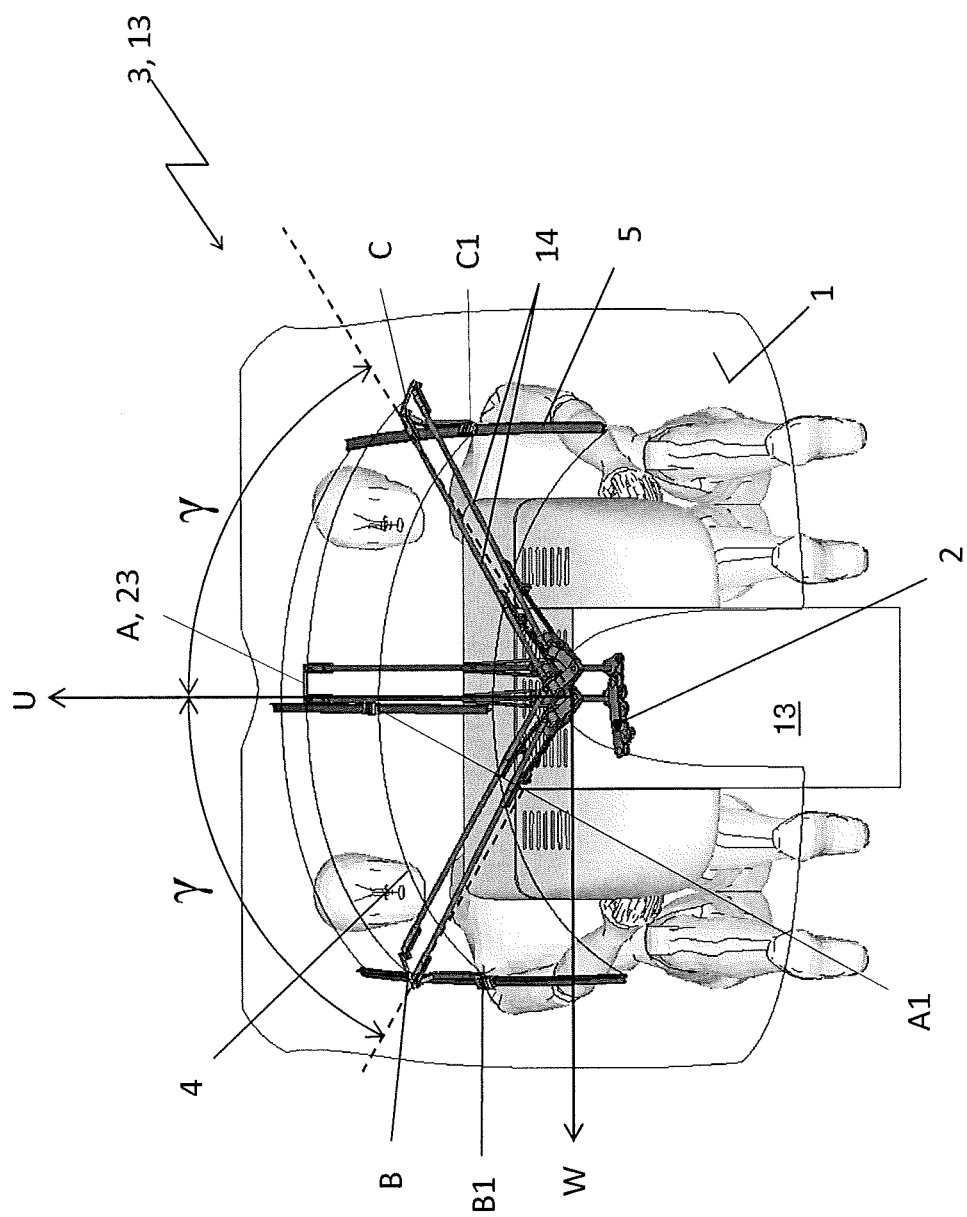
FIG. 2a-c show an overall schematic frontal view, an overall schematic lateral view and lateral views at different scales of cross sections of a wiper blade of a windshield wiper system for a curved windshield of a rotary wing aircraft according to the invention.
Figure 2B:
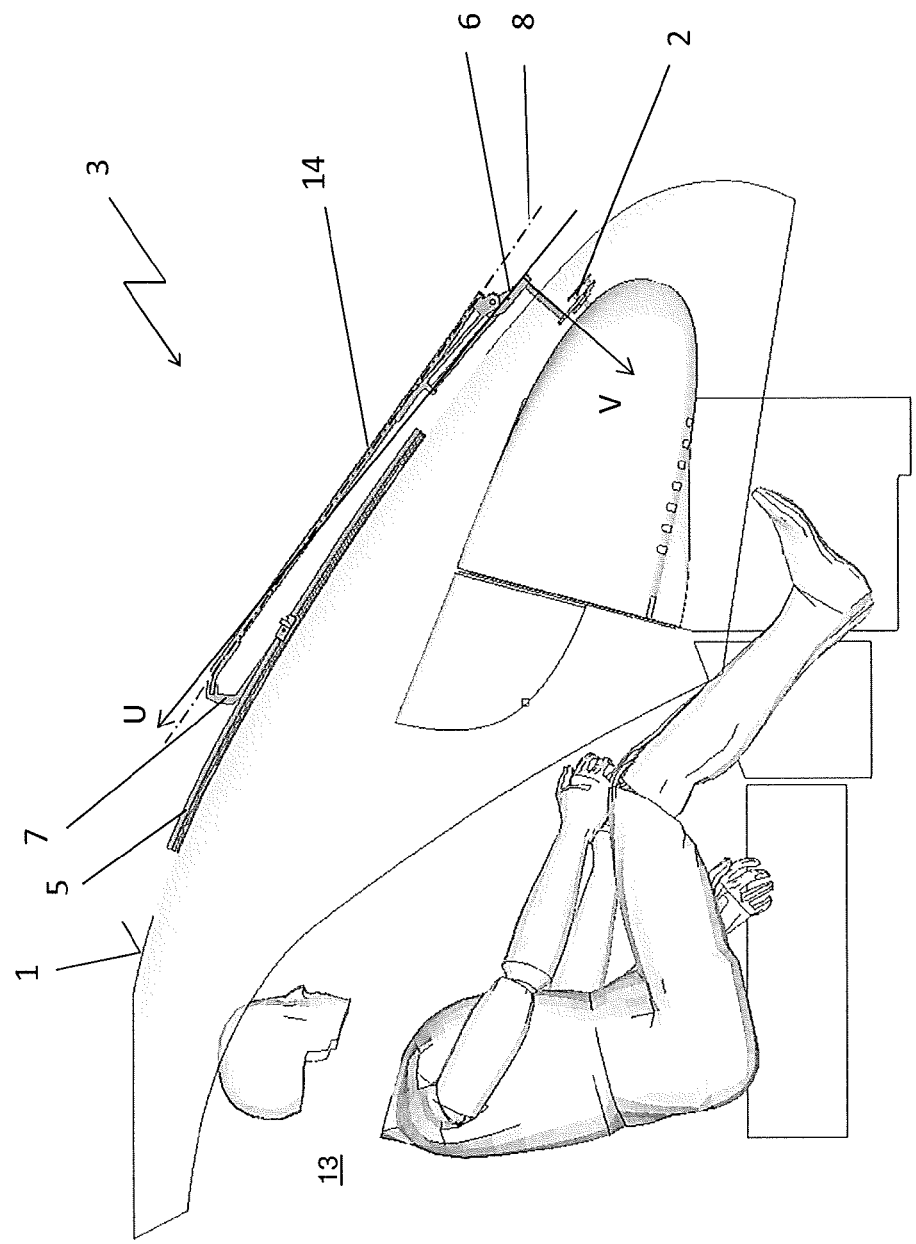
Figure 2C:
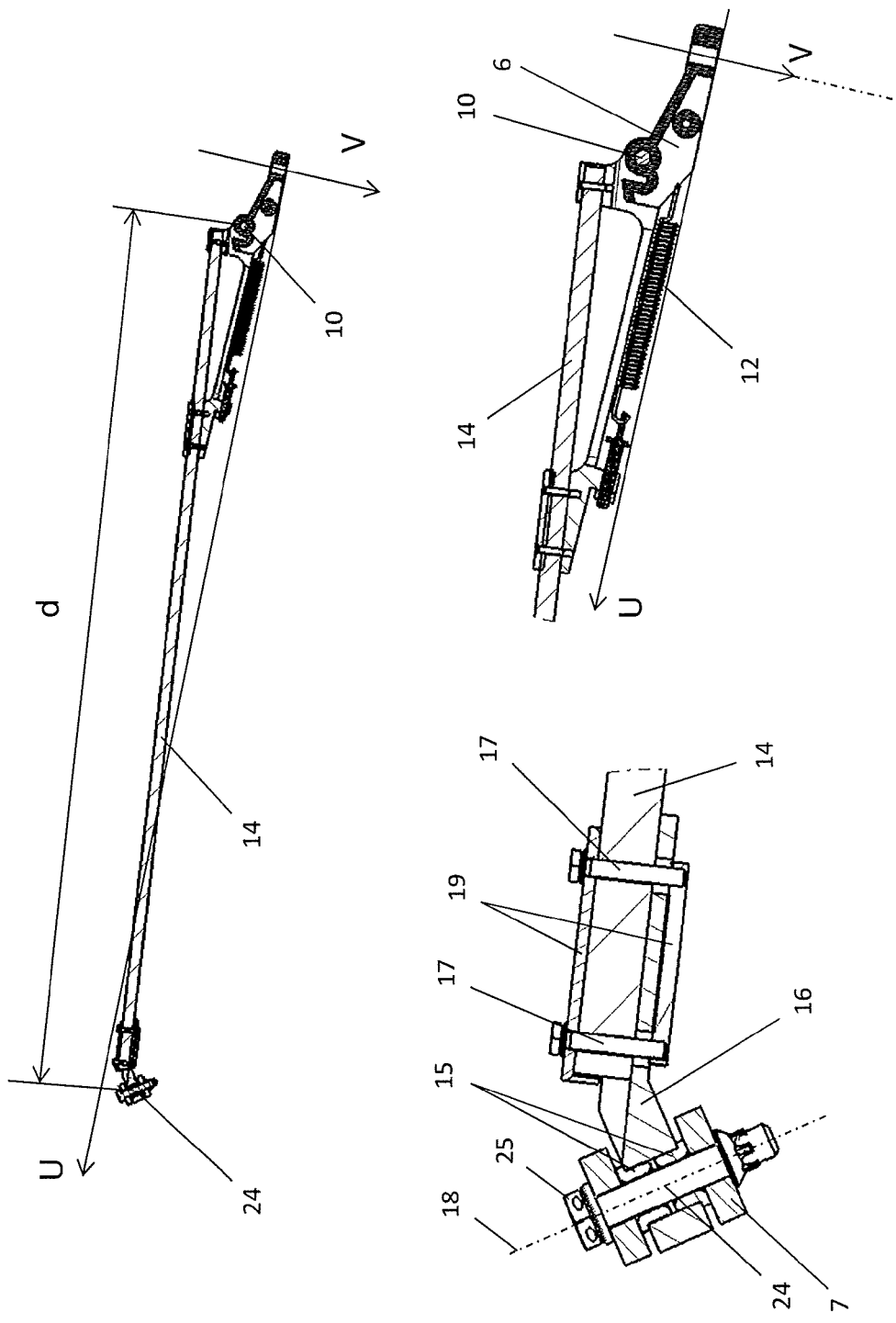

According to FIG. 2a-c corresponding features are referred to with the references of FIG. 1. A twin arm windshield wiper system 3 is placed with one wiper blade 5 on the curved rotary wing aircraft outer windshield surface 1, with a minimal radius of the windshield curvature of 400 mm in three dimensions.

The twin arm windshield wiper system 3 has three particular positions within a wiper operation area 4: An end position C of the wiper system 3 on the right side of the outer windshield surface 1, a central park position A of the wiper system 3 on the windshield 1 and an end position B of the wiper system 3 on the left side of the windshield 1. Each of said end positions B and C is angularly separated in opposed directions from the central park position A by an wiper operating angle ($\gamma$). The points A1, B1 and C1 are the contact points between the wiper blade lip 11 at the level of attachment of the wiper blade 5 to the wiper blade system 3 and the outer windshield surface 1 at the respectively position of the wiper system 3.

An oscillating gear drive 2 of the twin arm windshield wiper system 3 is mounted on to the windshield 1 for driving the two coupled wiper arms 14 with the attached wiper blade 5. The wiper blade 5 is arranged at the end of the two wiper arms 14, said end being distal to the gear drive 2. The oscillating gear drive 2 is arranged to drive the two wiper arms 14 with the attached wiper blade 5 across the wiper operating area 4 angularly separating the right wiper system position (C) from the left wiper system position (B) with an angle ($2\gamma$). The magnitude value of the wiper operating angle ($\gamma$) is equal to 42°.

Two wiper arms 14 are coupled parallel to each other in central park position (A) by means of a prolongation fitting 7 and the gear drive 2. The orientation of the—in its park position (A)—parallel wiper arms 14 changes in a three dimensional orientation during the rotation with angle $\gamma$ of the two wiper arms 14. The wiper arms 14 are attached to the gear drive 2 by means of two drive brackets 6. The longitudinal extension of the wiper drive bracket 6 defines in the central park position (A) a longitudinal axis (U) of a coordinate system inherent to the windshield 1. The wiper arms 14 are mounted by means of said drive brackets 6 at said oscillating drive 2 for oscillation about an oscillatory axis (V) across said curved surface of the windshield 1. Said oscillatory axis (V) is perpendicular to said longitudinal axis (U). At least one drive bracket 6 is driven by the gear drive 2. The other one of said two drive brackets 6 is dragged by the driven wiper arm 14 and the connected prolongation fitting 7 to the non-driven wiper arm 14. Said two wiper arms 14 are aligned in said central park position (A) with said longitudinal axis (U).

Each of said two wiper arms 14 is spring loaded and pivotal about a respective wiper arm rotation axis 10 in order to realize the translation of wiper blade 5 along the oscillatory axis (V). As a result the wiper arms can follow the three dimensional contour of the windshield outer surface 1.

Each of the two wiper arms 14 has a length (d). The length (d) of said wiper arm 14 defines the distance between the wiper arm rotation axis 10 and the center of a bore hole 24 in a cranked fitting 16. The cranked fitting 16 is adjustable attached to the wiper arm 14 by means of clamping pieces 19 and fit bolts 17 for more adaptive flexibility of the wiper system 3 to different windshields 1.

Each of two cranked fittings 16 are pivotal attached to the prolongation fitting 7 by means of the bearing bushes 15 and further fit bolts 25. The bearing bushes 15, which are installed on the cranked fittings 16, are able to rotate about the further fit bolts 25, where the center lines of the further fit bolts 25 define the prolongation fitting rotation axes 18.

A cross beam segment 23 of the prolongation fitting 7 connects two wiper arms 14 to each other.

Figure 3:
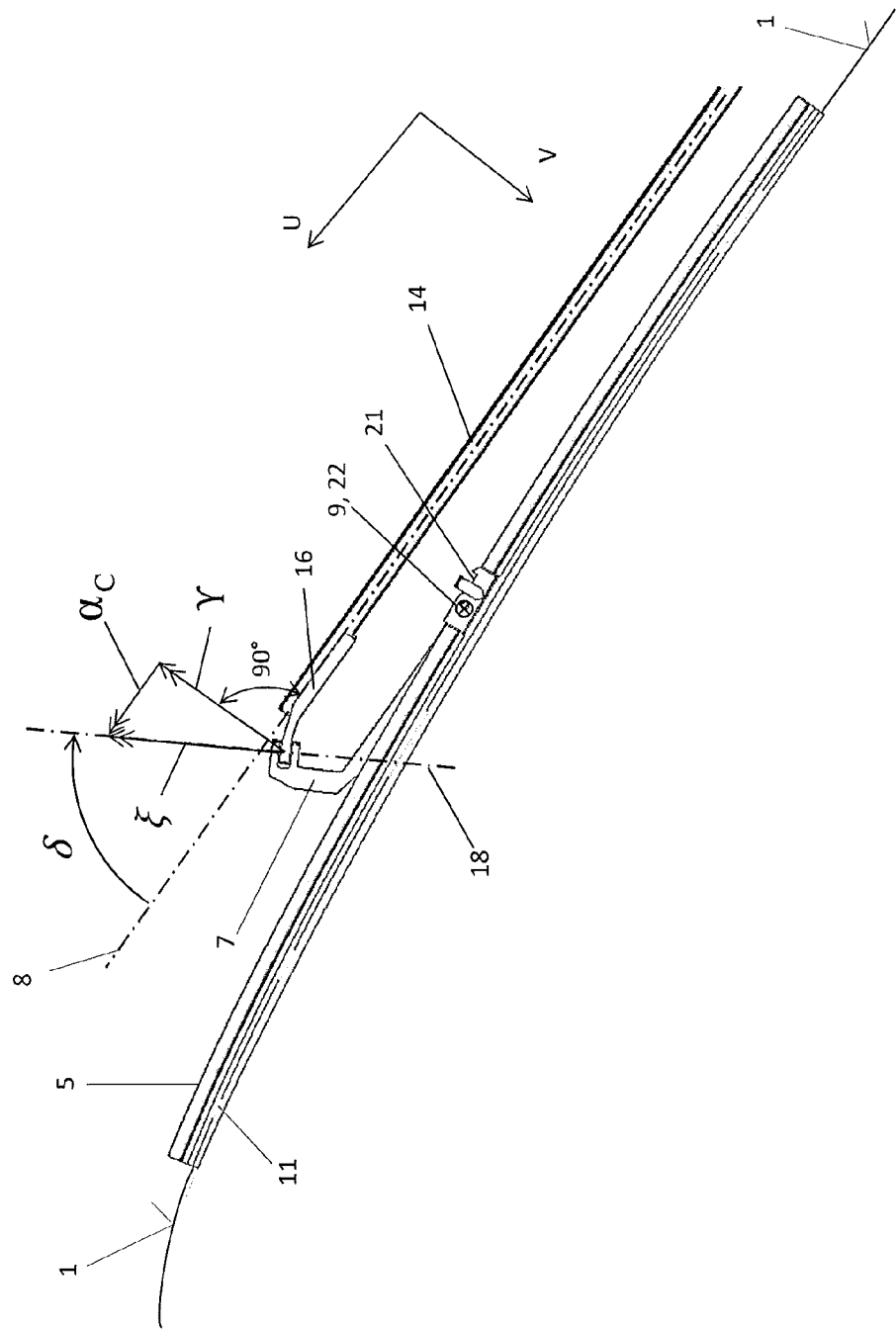
FIG. 3 shows a lateral view of a part of the windshield wiper system according to FIG. 2a-b.

According to FIG. 3 corresponding features are referred to with the references of FIG. 1, 2a-c. The wiper blade 5 is attached to a prolongation fitting 7 by means of a wiper blade shaft 22 and a wiper blade holder 21. The wiper blade shaft 22 is installed on the prolongation fitting 7, where the wiper blade holder can rotate about the wiper blade shaft 22. The center line of the wiper blade shaft 22 defines a wiper blade rotation axis 9. Therefore the wiper blade 5 is mounted rotatable about a wiper blade rotation axis 9, perpendicular to said oscillatory axis (V) and said longitudinal axis (U) in the central wiper system 3 park position A. Said rotation of the wiper blade 5 about the wiper blade rotation axis 9 and the flexible design of the wiper blade 5 in its longitudinal extension (l) allow the wiper blade 5 to follow the windshield curvature along its longitudinal extension.

The prolongation fitting rotation axes 18 are inclined with regard to wiper arm axes 8, which are defined by the longitudinal extension of the wiper arms 14, in the plane U-V by an angle (δ). The lean angle (α) is dependent on the respective magnitudes of the inclining angle (δ), angle (γ) and the curvature of the windshield 1. Due to the rotation of the drive brackets 6 about the oscillatory axis (V) by the angle (γ) the prolongation fitting 7 rotates about cranked fittings 16 perpendicular to the wiper arm axes 8 with the same angle (γ), thus the pantograph function of the wiper system 3 is fulfilled. The inclination of the prolongation fitting axes 18 by the inclining angle (δ) results in an additional alignment by means of rotation ($\alpha_c$) of the prolongation fitting 7 about the longitudinal axis 8 of the wiper arms 14. The rotation provides for the wiper blade rotation axis 9 being nearly tangential to the outer windshield surface 1 while moving of the wiper blade 5 along the transversal axis (W). The total rotation of the cranked fittings 16 about the prolongation fitting rotation axes 18 is given by an angle (ξ).

The range of the inclining angle (δ) is between 45°<δ<135°.

The angle inclining δ=90° causes no rotation $\alpha_c$ of the prolongation fitting 7, as —if the angle (δ) is equal to 90° the prolongation fitting 7 is always parallel to the wiper blade transversal axis (W) of the wiper system 3 as defined by the central park position A. Thereby the magnitude of the angle (ξ) is equal to the operating angle (γ) and the magnitude of the inclining angle ($\alpha_c$) is zero degree.

The inclining angle (δ) range between 45° and 90° provides for the alignment of the wiper blade rotation axis 9 tangential to the convex outer surface of the windshield 1 along the transversal axis (W). The inclining angle (δ) range between 90° and 135° provides the alignment of the wiper blade rotation axis 9 tangential to the concave windshield 1 along the transversal axis (W).

By the rotation with angle (γ) of two wiper arms 14 across the curved surface of the windshield 1 the prolongation fitting 7 is rotated with the total angle $$\xi = \frac{\gamma}{\cos(90° - \delta)}$$

about the respective prolongation fitting rotation axes 18. The respective prolongation fitting rotation axes 18 are inclined by the inclining angle (δ) determined by the inclination (90°−δ) of the cranked fittings 16 to the wiper arm axes 8. By the rotation with angle (γ) of the two wiper arms 14 the prolongation fitting 7 will rotate about wiper arms longitudinal axes 8 by an angle $\alpha_{c=\gamma\cdot tan(90°-\delta)}$ and as a result the wiper blade rotation axis 9 will be orientated tangential to the convex outer windshield surface 1 while oscillating along transversal axis (W), if the range between 45° and 90° of the inclining angle (δ) will be selected.

Figure 4:
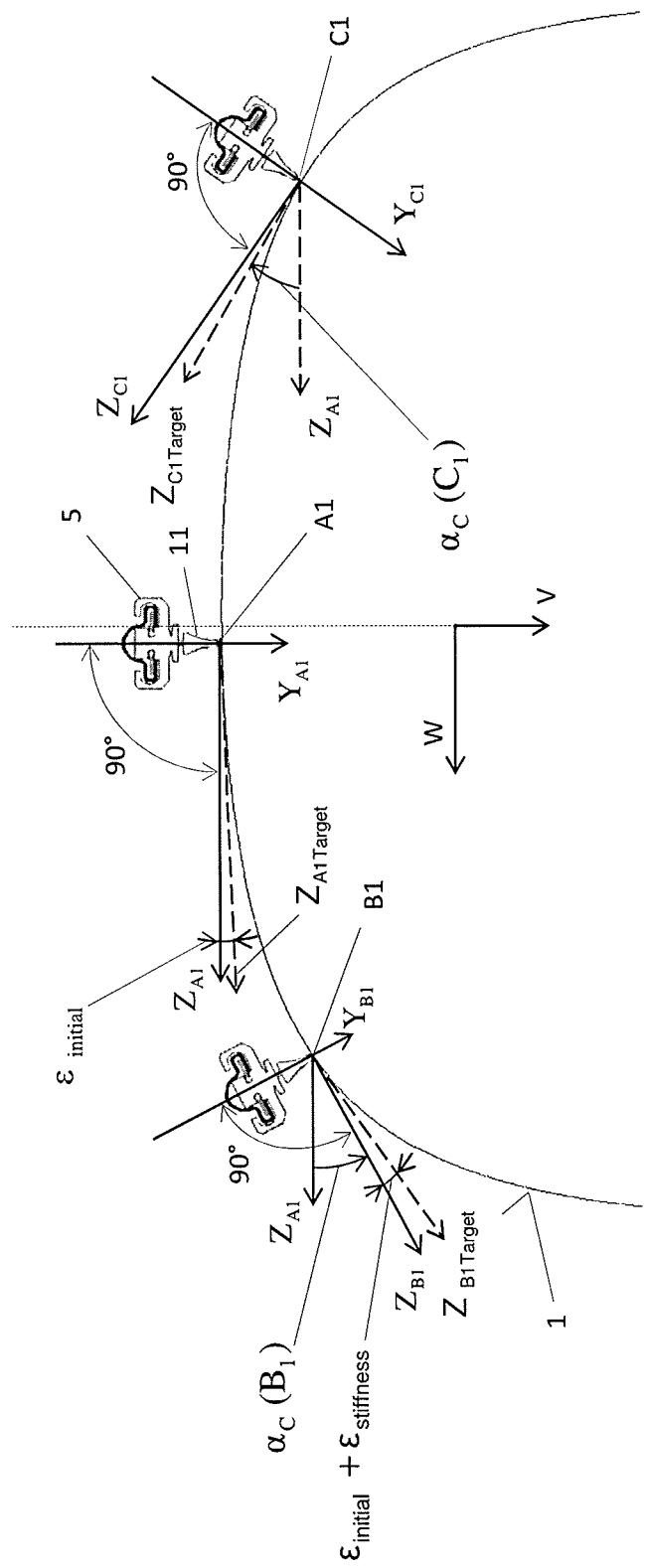
FIG. 4 shows another cross sectional view through a wiper blade in three different positions on a curved windshield of a rotary wing aircraft.

According to FIG. 4 corresponding features are referred to with the references of FIGS. 1-3. The prolongation fitting 7 rotation about the prolongation fitting rotation axes 18 results in an orientation of the wiper blade axis 9 tangential to the windshield outer surface 1, where the lean angle (α) is given by $\alpha=\alpha_T-(\alpha_C\pm\epsilon)$. The angle ($\epsilon_{initial}$) is the initial error tolerance angle, if the position of the wiper blade 5 in the park position A1 is not placed on the symmetry axis of the windshield 1. This error angle ($\epsilon_{initial}$) can be eliminated, if the prolongation fitting 7 is inclined (has a kink) or if the wiper blade rotation axis 9 is inclined to the windshield 1 by the same initial error tolerance angle due to the wiper system 3 park position A1 geometry. The angle ($\epsilon_{Stiffness}$) is the error tolerance angle given by the stiffness of the wiper system 3. Thus wiper system 3 structural components with higher stiffness are preferred. Both angles together produce maximal about 4° error tolerance which has to be compensated. As long as the absolute value of the lean angle (α) does not exceed the magnitude of 20° the cleaning performance of the wiper blade 5 is acceptable.

The angles $\alpha_c$ ($B_1$) and $\alpha_c$ ($C_1$) show respectively the rotation of the wiper blades in the outer positions of the operating area 4 according to the formula $\alpha_{c=\gamma\cdot tan}$ (90°−δ). The angle ($\alpha_T$) is the target lean angle given by the geometry of the windshield 1. The angle ($\alpha_c$) is the design lean angle of the system, where the inclining angle (δ) is selected with the consequence, that the design lean angle ($\alpha_c$) is equal to the maximal target lean angle ($\alpha_T$) in outer wiper blade positions B1 and C1.

Therefore the wiper blade lean angle (α) in outer windshields positions B1 and C1 as well as in the central park position A1 is less than 4°. In all other wiper blade 5 positions along the line A1-B1-C1 an additional error tolerance angle ($\epsilon_{Windshield}$), which is the result of the linear behavior of the design lean angle ($\alpha_c$) and non-linear curvature gradient of the regarded windshield 1. The lean angle (α) in those areas along the line A1-B1-C1 is less than 6° to 8°. Therefore the cleaning performance of the wiper blade 5 is well in regarded wiper operating area 4. If the inclining angle (δ) is equal to 0° selected, what is comparable to a conventional wiper system with pantograph function, the maximal lean angle (α) is equal to 30° in regarded windshield wiper operating area 4.

Figure 5A:
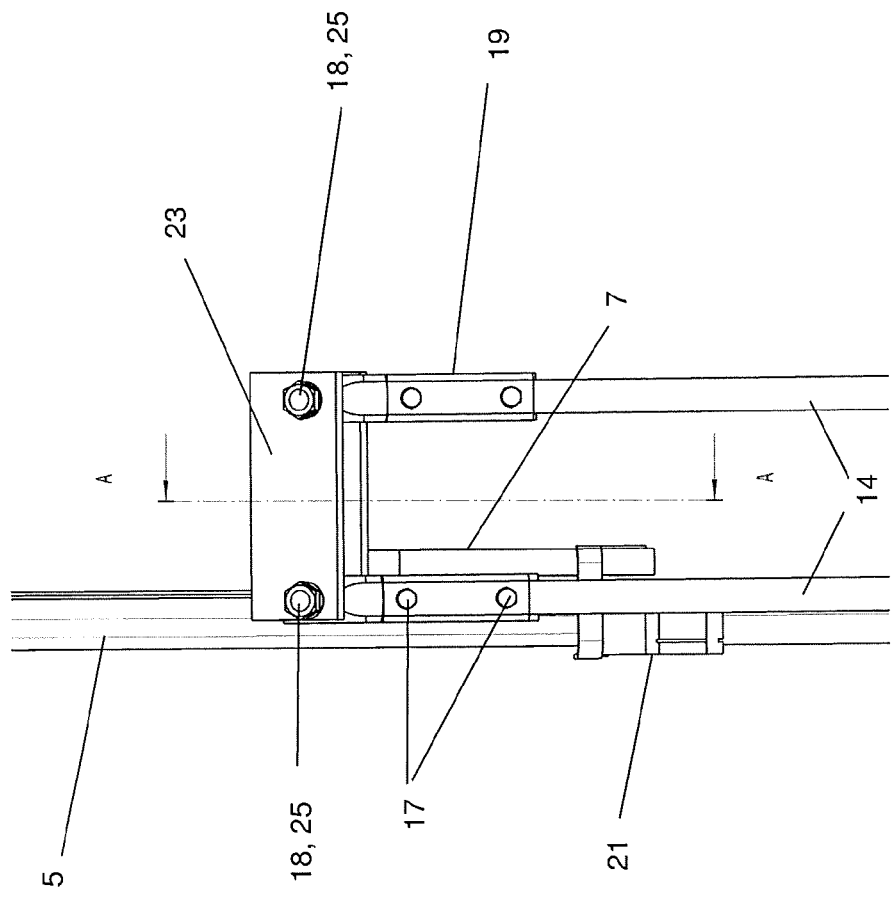
FIG. 5a shows a top view of a part of the windshield wiper system according to the invention.
Figure 5B:
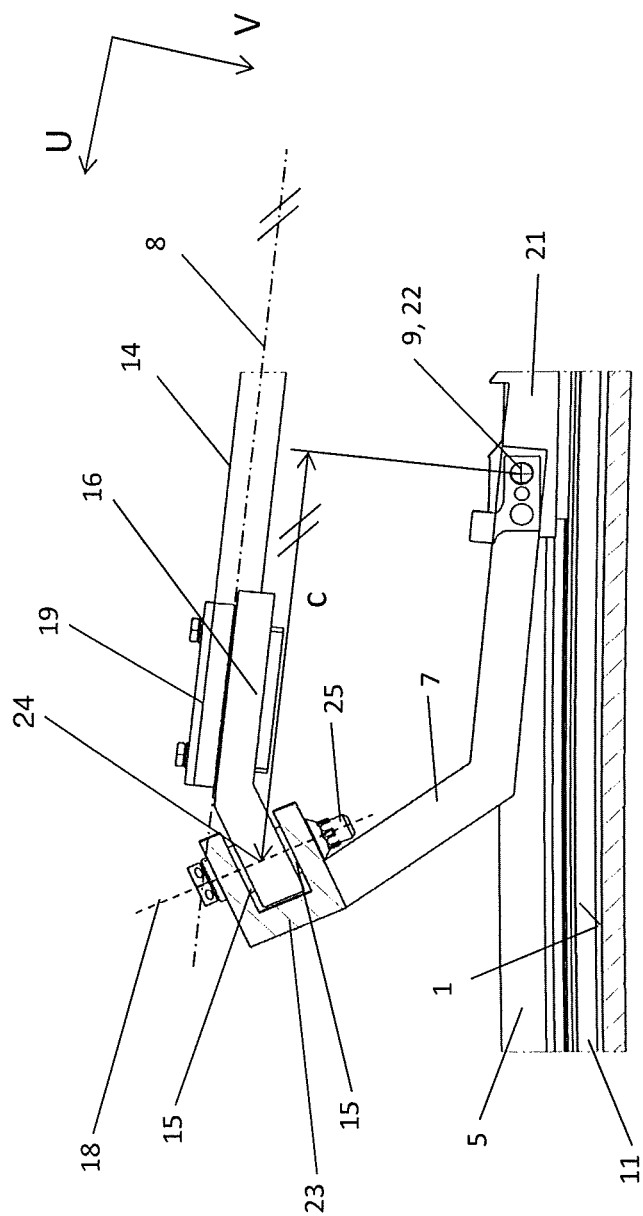
FIG. 5b shows a lateral view of a part of the windshield wiper system according to the invention.

According to FIG. 5a-b corresponding features are referred to with the references of FIG. 1-4. A distance (c) is defined to be in between the projected point of the center of a bore hole 24 on the cranked fitting 16 and the projected wiper blade rotation axis 9 to the wiper arm axis 8. Therefore the design length of prolongation fitting and the position of wiper blade rotation axis 9 on the prolongation fitting 7 determine the distance (c). Due to the magnitude of this distance (c) the wiper operating area 4 can be displaced along the axis U away or toward to gear drive 2.

The width (w) of the wiper operating area 4 is depended on the magnitude of the wiper arm length (d).

The lengths (c) and (d) are variable and allow the adaption/modification of the wiper operating area 4 to different windshield geometries and curvatures for relevant visibility requirements of the pilots/customers.

For example the prolongation fitting 7 is elongated in reverse U direction from the center of bore hole 24 the wiper blade 5 would be removed towards the lower area of the windshield 1 and improves the visibility in this area, which is important for the rotary wing aircraft landing maneuver. An increase of the lengths (d) of the wiper arms 14 leads to an increased width (w) of the wiper system 3 operating area 4. Thus for different wiper operating areas 4 on different windshields 1 the wiper system 3 allows use of the same gear drive concept with the same maximal oscillating angle ($\gamma$).

| | Reference List |
|---|---|
| 1 | Windshield (Outer Surface) |
| 2 | Gear Drive |
| 3 | Wiper System |
| 4 | Operating Area |
| 5 | Wiper Blade |
| 6 | Drive Bracket |
| 7 | Prolongation Fitting |
| 8 | Wiper Arm Axis |
| 9 | Wiper Blade Rotation Axis |
| 10 | Wiper Arm Rotation Axis |
| 11 | Wiper Blade Lip |
| 12 | Spring |
| 13 | Vehicle |
| 14 | Wiper Arm(s) |
| 15 | Bearing Bushes |
| 16 | Cranked Fitting |
| 17 | Bolts (Cranked Fitting to Clamping Piece) |
| 18 | Prolongation Fitting Rotation Axes |
| 19 | Clamping Pieces |
| 20 | |
| 21 | Wiper Blade Holder |
| 22 | Wiper Blade Shaft |
| 23 | Cross Beam |
| 24 | Center of the Bore Hole on the Cranked Fitting |
| 25 | Fit Bolts |

What is claimed is:

1. A windshield wiper system for a vehicle having a windshield of an outer curved surface and the windshield wiper system having an oscillating gear drive with a park position, the system comprising:
   two coupled wiper arms and one wiper blade, one of the two wiper arms being mounted to said oscillating gear drive, the wiper blade having a flexible design and being mounted by means of the two wiper arms distal to the oscillating gear drive for oscillation across the windshield about an oscillatory axis, the wiper blade defining a longitudinal extension along the curved surface of the windshield, the two wiper arms being aligned with the longitudinal extension and having each along the curved windshield outer surface a respective pivotal wiper arm axis, perpendicular relative to the oscillatory axis at the oscillating gear drive and a longitudinal axis;
   a wiper blade shaft, two bearing bushes, two fit bolts, two cranked fittings and a prolongation fitting are provided, the wiper blade being mounted rotatable about a wiper blade rotation axis by means of a wiper blade holder and the wiper blade shaft to the prolongation fitting, the wiper blade rotation axis being substantially tangential to the windshield outer surface, the prolongation fitting is mounted by the bearing bushes and fit bolts respectively rotatable about prolongation fitting rotation axes perpendicular to the cranked fittings on the wiper arms, the oscillating gear drive of the windshield wiper system has a central wiper system park position, such that the park position of the wiper blade is in the central position of the windshield,
   the wiper blade being mounted rotatable about the wiper blade rotation axis, perpendicular to an oscillatory axis and to a longitudinal axis in a central wiper system park position, the prolongation fitting rotation axes are inclined with regard to wiper arm axes, which are defined by the longitudinal extension of the wiper arms, in a plane formed by the oscillatory axis and the longitudinal axis by an inclining angle, the prolongation fitting rotation axes being inclined to a respective wiper arm axis of each of the two wiper arms by the inclining angle that is between 45° and 135°, so that the rotation of the wiper blade about the wiper blade rotation axis and the flexible design of the wiper blade allow the longitudinal extension of wiper blade to follow the windshield curvature.

2. A rotary wing aircraft having a windshield wiper system for a windshield with a curved surface, wherein the windshield wiper system is as per claim 1.

3. A windshield wiper system for a vehicle having a windshield with an outer curved surface, the windshield wiper system comprising:
   a pair of wiper arms connected at a first end to an oscillating gear drive for oscillation across the windshield about an oscillatory axis of the gear drive, wherein longitudinal axes of the wiper arms are generally perpendicular to the oscillatory axis of the gear drive:
   a prolongation fitting mounted to the pair of wiper arms at a distal end opposite the gear drive, the prolongation fitting mounted to rotate about a prolongation rotation axes oriented at an inclining angle that is inclined between 45° and 135° relative to the longitudinal wiper arm axes; and
   a flexible wiper blade rotatably mounted to the prolongation fitting with a wiper blade holder, wherein the wiper blade is rotatable about a wiper blade rotation axis being substantially tangential to the outer curved surface of the windshield and generally perpendicular to the oscillatory axis and perpendicular to the longitudinal wiper arm axes,
   wherein the wiper blade defines a longitudinal extension for contacting the outer curved surface of the windshield, and when the gear drive is in a park position, the longitudinal wiper arm axis is aligned with the longitudinal extension of the wiper blade and is positioned along a central region of the windshield,
   wherein as the wiper arms oscillate away from the park position, rotation of the prolongation fitting about the prolongation rotation axis and rotation of the wiper blade about the wiper blade rotation axis allow the longitudinal extension of the wiper blade to maintain contact with the outer curved surface of the windshield.

4. The windshield wiper system of claim 3 wherein the pair of wiper arms are spring loaded.

5. The windshield wiper system of claim 3 wherein at least one of the pair of wiper arms is mounted to the gear drive by a drive bracket, where the at least one wiper arm rotates relative to the drive bracket about a wiper arm rotation axis.

6. The windshield wiper system of claim 3 wherein the pair of wiper arms are connected by a cross beam at the distal end.

7. The windshield wiper system of claim 3 wherein the prolongation fitting is mounted to the pair of wiper arms with a bolt and a bearing bush on each of the pair of wiper arms, wherein the center lines of the bolts define the prolongation rotation axes.

8. The windshield wiper system of claim 7 further comprising a crank fitting adjustably connected along the distal end of the pair of wiper arms to vary a length of the wiper arms, wherein the prolongation fitting is connected to the crank fitting by the bearing bushes installed on the crank fitting.

\* \* \* \* \*